US008490154B2

(12) United States Patent
Gomez et al.

(10) Patent No.: US 8,490,154 B2
(45) Date of Patent: Jul. 16, 2013

(54) METHOD AND SYSTEM FOR AUTHENTICATION BY DEFINING A DEMANDED LEVEL OF SECURITY

(75) Inventors: Laurent Y. Gomez, Le Cannet (FR); Ivonne Thomas, Stahnsdorf (DE)

(73) Assignee: SAP AG, Walldorf (DE)

( * ) Notice: Subject to any disclaimer, the term of this patent is extended or adjusted under 35 U.S.C. 154(b) by 922 days.

(21) Appl. No.: 11/903,257

(22) Filed: Sep. 21, 2007

(65) Prior Publication Data

US 2008/0141339 A1  Jun. 12, 2008

(30) Foreign Application Priority Data

Dec. 11, 2006  (EP) ..................................... 06291907

(51) Int. Cl.
*G06F 7/04* (2006.01)
*G06F 17/30* (2006.01)

(52) U.S. Cl.
USPC ............. 726/2; 726/1; 726/3; 726/4; 726/14; 726/16; 726/17; 726/21; 726/26; 726/27; 726/28; 726/10; 713/161; 713/168; 713/151; 713/153; 713/192; 713/166; 713/184; 380/2; 380/42; 705/44; 705/72

(58) Field of Classification Search
USPC ............................................................ 726/1
See application file for complete search history.

(56) References Cited

U.S. PATENT DOCUMENTS

| | | | |
|---|---|---|---|
| 6,138,238 A | | 10/2000 | Scheifler et al. |
| 6,668,322 B1* | | 12/2003 | Wood et al. .................... 713/182 |
| 2002/0194003 A1* | | 12/2002 | Mozer ......................... 704/270.1 |
| 2003/0217137 A1* | | 11/2003 | Roese et al. .................. 709/223 |
| 2004/0111375 A1* | | 6/2004 | Johnson .......................... 705/64 |
| 2004/0128547 A1* | | 7/2004 | Laidlaw et al. ................ 713/201 |
| 2004/0215956 A1 | | 10/2004 | Venkatachary et al. |
| 2004/0268142 A1* | | 12/2004 | Karjala et al. ................. 713/200 |
| 2005/0065950 A1 | | 3/2005 | Chaganti et al. |
| 2006/0046691 A1* | | 3/2006 | Nishio ........................... 455/410 |
| 2008/0066175 A1* | | 3/2008 | Dillaway et al. ................ 726/21 |
| 2008/0263625 A1* | | 10/2008 | Gomez et al. ...................... 726/1 |

FOREIGN PATENT DOCUMENTS

| | | |
|---|---|---|
| WO | WO-0000879 A2 | 1/2000 |
| WO | WO-0079434 A1 | 12/2000 |
| WO | WO-2005125077 A1 | 12/2005 |

OTHER PUBLICATIONS

"European Application No. 06291907.1, Extended European Search Report mailed May 10, 2007", 6 pgs.
"U.S. Appl. No. 10/948,150, Non Final Office Action mailed Apr. 1, 2008", 9 pgs.
"U.S. Appl. No. 10/948,150, Non Final Office Action mailed Jun. 27, 2007", 17 pgs.

(Continued)

*Primary Examiner* — Nathan Flynn
*Assistant Examiner* — Bryan Wright
(74) *Attorney, Agent, or Firm* — Schwegman Lundberg & Woessner, P.A.

(57) ABSTRACT

There is provided a computer-implemented method for authentication, the method comprising:
  defining a demanded level of security in an authorization service of a server;
  providing at least one authentication mechanism comprising at least one instance for at least one client;
  providing a policy comprising a security level for the at least one instance;
  receiving at least one request from the client to the server;
  authenticating the request based on the policy and the demanded level of security by the authentication service; and
  permitting the request if the demanded level of security is reached.

17 Claims, 9 Drawing Sheets

OTHER PUBLICATIONS

"U.S. Appl. No. 10/948,150, Notice of Allowance mailed Sep. 18, 2008", 6 pgs.

"U.S. Appl. No. 10/948,150, Response filed Jun. 23, 2008 to Non Final Office Action mailed Apr. 1, 2008", 9 pgs.

"U.S. Appl. No. 10/948,150, Response filed Dec. 27, 2007 to Non Final Office Action mailed Jun. 27, 2007", 15 pgs.

"European Application Serial No. 06291847.9, Extended European Search Report mailed Jul. 27, 2007", 6 pgs.

"European Application Serial No. 06291847.9, Office Action mailed Mar. 6, 2009", 5 pgs.

"European Application Serial No. 06291847.9, Office Action mailed Jul. 16, 2009", 10 pgs.

"European Application Serial No. 06291847.9, Office Action mailed Oct. 31, 2008", 3 pgs.

"European Application Serial No. 06291847.9, Response filed May 11, 2009 to Office Action mailed Mar. 6, 2009", 9 pgs.

"European Application Serial No. 06291847.9, Response filed Dec. 12, 2008 to Office Action mailed Oct. 31, 2008", 13 pgs.

"eXtensible Access Control Markup Language (XACML) Version 1.1", OASIS (IBM, Sun, BEA, Entrust et al.), [Online]. Retrieved from the Internet: <URL: http://www.oasis-open.org/committees/xacml/repository/cs-xacml-specification-1.1.pdf>, (Aug. 7, 2003), 67 pgs.

"Securing SOAP Messages with WSS4J", [Online]. Retrieved from the Internet: <URL: ttp://ws.apache.org/axis2/modules/rampart/1_0/security-module.html>, (Archived Oct. 12, 2006), 4 pgs.

"Technical Standard, Authorization (AZN) API", The Open Group, UK, (2000), 124 pgs.

Bhatti, Rafae, et al., "Access Control in Dynamic XML-based Web-Services with X-RBAC", [Online]. Retrieved from the Internet: <URL: http://www.sis.pitt.edu/~jjoshi/ICWS_XRBAC_Final_PDF.pdf>, (2003), 7 pgs.

Damianou, Nicodemos, et al., "Ponder: A Language for Specifying Security and Management Policies for Distributed Systems", The Language Specification, Verision 1.11, Imperial College Research DoC 2000/1, [Online]. Retrieved from the Internet: <URL: http://www.doc.ic.ac.uk/research/technicalreports/2000/DTR00-1.pdf>, (Jan. 18, 2000), 39 pgs.

Harold, Carr, "Sun's Project Tango", [Online]. Retrieved from the Internet: <URL: http://web.archive.org/web/20061124051012/http://java.sun.com/developer/technicalArticles/glassfish/Project-Tango/?feed=JSC >, (Jun. 2006), 3 pgs.

Hendrik, R, "An Introduction to Web Service Security using WSE—Part I", [Online]. Retrieved from the Internet: <URL: http://web.archive.org/web/20050206002831/www.codeproject.com/webservices/WS-Security.asp>, (May 17, 2004), 13 pgs.

Ilechko, Paul, et al., "Authorization concepts and solutions for J2EE applications", [Online]. Retrieved from the Internet: <URL: http://www-28.ibm.com/developerworks/websphere/library/techarticles/0607_ilechko/0607_ilechko.html >, (Jul. 19, 2006), 9 pgs.

Karjoth, Gunter, "Access control with IBM Tivoli access manager", ACM Transactions on Information and System Security (TISSEC), vol. 6, Issue 2, Abstract Only, [Online]. Retrieved from the Internet: <URL: http://portal.acm.org/citation.cfm?id=762476.762479>, (May 2003), 232-257.

Minami, Kazuhiro, "Secure Context-sensitive Authorization", Dartmouth Technical Report TR2006-571, [Online]. Retrieved from the Internet: <URL: http://www.ists.dartmouth.edu/library/180.pdf >, (Feb. 2006), 156 pgs.

Welch, Von, et al., "OGSI Authorization Requirements: Status of This Memo", [Online]. Retrieved from the Internet: <URL: http://www.ggf.org/documents/GFD.67.pdf >, (May 26, 206), 9 pgs.

Yao, Han-Bing, et al., "Dynamic Role and Context-Based Access Control for Grid Application", TENCON 2005, IEEE Region 10, (Nov. 2005), 1-7.

"U.S. Appl. No. 11/948,150, Non Final Office Action mailed May 5, 2011", 4 pgs.

"U.S. Appl. No. 11/948,150, Non Final Office Action mailed Aug. 19, 2011", 4 pgs.

"U.S. Appl. No. 11/948,150, Non Final Office Action mailed Oct. 28, 2010", 6 pgs.

"U.S. Appl. No. 11/948,150, Notice of Allowance mailed Feb. 18, 2011", 6 pgs.

"U.S. Appl. No. 11/948,150, Notice of Allowance mailed Dec. 12, 2011", 5 pgs.

"U.S. Appl. No. 11/948,150, Response filed Jan. 28, 2011 to Non Final Office Action mailed Oct. 28, 2010", 9 pgs.

"U.S. Appl. No. 11/948,150, Response filed Jun. 7, 2011 to Non Final Office Action mailed May 5, 2011", 6 pgs.

"U.S. Appl. No. 11/948,150, Response filed Nov. 21, 2011 to Non Final Office Action mailed Aug. 19, 2011", 7 pgs.

"European Application Serial No. 06291907.1, Office Action mailed Mar. 25, 2010", 3 pgs.

"European Application Serial No. 06291907.1, Office Action mailed Jul. 12, 2012", 2 pgs.

"European Application Serial No. 06291907.1, Response filed May 28, 2010 to Office Action mailed Mar. 25, 2010", 16 pgs.

"European Application Serial No. 06291907.1, Response filed Jul. 10, 2007 to Office Action mailed May 18, 2005", 13 pgs.

"European Application Serial No. 06291907.1, Response filed Jul. 30, 2012 to Office Action mailed Jul. 12, 2012", 9 pgs.

* cited by examiner

```
<CredentialList>—510
<--! First Credential Combination-->
    <CredentialCombination>
    <--! A Password with password length-->    511
        <CredentailDescription>
            <Credential DataType="string">classes:Password</AttributeValue>
            <Required>MinimumPasswordLength<Required/>      512    513
        </CredentailDescription>
    <--! An X509 Certificate with Issuer-->
        <CredentailDescription>
            <AttributeValue DataType="string">classes:X509</AttributeValue>
            <Required>Issuer<Required/>
        </CredentailDescription>      514
    </CredentialCombination>
<--! Second Cerdential Combination-->——520
    <CredentialCombination>
    <--! An X509 Certificate with Issuer-->    521
        <CredentailDescription>
            <AttributeValue DataType="string">classes:X509</AttributeValue>
            <Required>Issuer<Required/>
        </CredentailDescription>      522
        <CredentailDescription>
            <AttributeValue DataType="string">classes:FingerPrint</AttributeValue>
            <Required>FalsePositive<Required/>      523
        </CredentailDescription>
    </CredentialCombination>      524
</CredentialList>
```

FIG. 5

METHOD AND SYSTEM FOR AUTHENTICATION BY DEFINING A DEMANDED LEVEL OF SECURITY

CLAIM OF PRIORITY

The present patent application claims the priority benefit of the filing date of European Application (EPO) No. 06291907.1 filed Dec. 11, 2006, the entire content of which is incorporated herein by reference.

TECHNICAL FIELD

The description is directed generally to authentication, in particular in ubiquitous computing environments, and, in one example, to a method, a system, and a computer program product for authentication from, e.g., a mobile device to a service independent from a particular authentication mechanism.

BACKGROUND

In distributed systems such as service oriented architectures (SOAs), a service such as a Web service provides access to data from a user (e.g. an end user or another service), which needs to be restricted. Access control is commonly achieved by enforcing a policy through an authorization service. To decide whether the user is authorized to access the data, the authorization service needs to authenticate the user. For this purpose, authentication mechanisms are used.

In a ubiquitous computing environment of, e.g., wireless connectivity and widespread diffusion of various mobile and/or portable devices, frequently having different capabilities for authentication, consistent and reliable authentication becomes even more challenging.

SUMMARY

In one example aspect, a method for authentication may comprise:
- defining a demanded level of security in an authorization service of a server;
- providing at least one authentication mechanism comprising at least one instance for at least one client;
- providing a policy comprising a security level for the at least one instance of the at least one authentication mechanism;
- receiving at least one request from the client to the server;
- authenticating the request based on the policy and the demanded level of security by the authentication service; and
- permitting the request if the demanded level of security is reached.

By defining a demanded level of security in an authorization service, a user/client is not required to provide the authorization service a specific instance of an authentication mechanism and/or a specific authentication mechanism. Rather, the user/client may provide the authorization service with at least one and/or a combination of at least two instances of authentication mechanisms, which may be available for the user/client. Hence, authentication may become independent from certain authentication mechanisms, and, is thus, more flexible, even in a ubiquitous computing environment, wherein it cannot be ensured that, for example, a small client device is provided with a particular authentication mechanism.

Examples of authentication mechanisms may, for example, include password-based mechanisms and certificate mechanisms, for example x509 certificate mechanisms. An instance of the password-based mechanism may be, for example, a password-based mechanism having a demanded password length of 10 characters. An instance of the x509 certificate mechanism may be, for example, an x509 certificate-based mechanism having a demanded issuer such as company A.

By providing a security level for the at least one instance, the demanded level of security may be reached by comparing the security level with the demanded level of security and/or by combining at least two security levels of at least two instances and comparing the combined security level to the demanded level of security.

Accordingly, a security level may be, for example, a numeric value within $[0,1]$, i.e. any number within the continuous interval between 0 and 1. For example, the instance of the x509 certificate mechanism issued by company A may have security level 0.5 and the instance of the password-based mechanism having password length 10 characters may have security level 0.3. In case, the demanded level of security is 0.4, it would, for example, be sufficient for the client/user to provide the x509 certificate mechanism issued by company A as authentication means to the authorization service. Is the demanded level of security, however, e.g., 0.6, the client/user must provide a combination of the two instances (i.e. the x509 certificate mechanism issued by company A and the password-based mechanism having password length 10 characters) to authenticate at the authorization service.

Access control may refer to the practice of restricting entrance to an object and/or a resource such as a file system, a database system, or a process, i.e. an ability to permit or deny request, use, and/or manipulate of an object and/or a resource to authorized and unauthorized requesters, respectively. Accordingly, an access control rule may substantially comprise a condition, which must be fulfilled by a subject or an identity such as a requester in view of a requested object and/or resource. A condition may substantially be a Boolean function, which may evaluate to true or false. A policy may represent a single access control policy, expressed through a set of one or more access control rules.

By receiving at least one request from the client to the server, commonly a user on the client requests access to a protected resource such as a service or a file on the server. In order to grant or deny access to the protected resource, the server may further comprise an authorization service. The authorization service may authorize the user by checking a list of credentials. A credential may be an assertion of the user about himself comprising an authentication mechanism and further information about the user.

Accordingly, an authentication mechanism may define rules for security information, e.g. whether a client may access a protected resource. Authentication may refer to the process, whether the identity of a client in a given context, e.g. when sending a request to a protected service located on a server in order to perform at least one action (e.g. to download documents provided by the service) is authentic. A client may be a user of a computer, a computer, or an application running on a computer.

According to another example aspect, the method may further comprise:
- providing
  - either a plurality of authentication mechanisms each comprising at least one instance or at least one authentication mechanism comprising a plurality of instances for the client, wherein the policy further comprises security levels for the instances, respectively, and wherein authenticating the request based on the policy and the demanded level of security may comprise combining at least two of the security levels.

Accordingly, each instance of the plurality of instances may be enhanced with a corresponding security level.

According to yet another example aspect, the security level for the at least one instance may be based on a trust opinion, wherein the trust opinion may comprise at least one objective criteria and at least one subjective criteria.

Accordingly, a security level assigned to an instance of an authentication mechanism may not merely be an objective criterion, such as, for example, a probability according to which an attack to the instance may be successful. Rather, in addition to such an objective criteria, the trust opinion may comprise a subjective criteria, which may, for example, refer to a belief or an experience the client/user might have had with the instance in the past.

For example, a certificate mechanism issued by company A may have an objective probability of 0.6 to be successfully attacked. For a user having had, for example, negative experiences with the company A, and, thus, not having a high trust into a certificate issued by company A, a subjective criterion, expressed in terms of an uncertainty on the security level of said instance, may be, for example, only 0.3. Accordingly, the trust opinion of said instance would be, for example, a combination of the objective and the subjective criteria.

Accordingly, an instance enhanced with a security level based on a trust opinion may comprise a measure of security, which is based on a trust metric incorporating uncertainty usually associated with security. In particular, a perception of security provided by an instance of an authentication mechanism may depend not only on its probability to be successfully attacked, about also, or even, in particular, on experiences and beliefs of a user with the instance. Note that trust opinion is also referred to as opinion in the following description.

According to yet another example aspect, the trust opinion may be expressed in subjective logic.

Accordingly, definition of trust opinions on security levels and determination of possible combinations of security levels in order to combine respective instances of authentication mechanisms, subjective logic may be used. Subjective logic defines a framework for expressing trust opinions and instructions to compute with said trust opinions.

According to yet another example aspect, combining at least two of the security levels may comprise:

applying one or more combining operators on the at least two security levels, wherein the one or more combining operators may be operators of subjective logic.

Accordingly, adequate operators such as the operators of the subjective logic framework may be used to implement operations to combine at least two instances of authentication mechanisms by combing their associated security levels.

In another example aspect, there is provided a computer-program product comprising computer readable instructions, which when loaded and run in a computer system and/or computer network system, causes the computer system and/or the computer network system to perform a method as described.

In yet another example aspect, a system for authentication may comprise:

a server comprising an authorization service defining a demanded level of security;

a client comprising at least one instance of at least one authentication mechanism; and a policy comprising a security level for the at least one instance of the at least one authentication mechanism;

wherein the authorization service is operable to:

receiving at least one request from the client to the server;

authenticating the request based on the policy and the demanded level of security by the authentication service; and permitting the request if the demanded level of security is reached.

According to yet another example aspect, the system is further operable to perform operations according to anyone of the described methods.

Details of one or more implementations are set forth in the accompanying exemplary drawings and exemplary description below. Other features will be apparent from the description and drawings, and from the claims.

BRIEF DESCRIPTION OF THE DRAWINGS

FIG. 5 shows an exemplary credential list.

DETAILED DESCRIPTION

In the following, a detailed description of examples will be given with reference to the drawings. It should be understood that various modifications to the examples may be made. In particular, elements of one example may be combined and used in other examples to form new examples.

Figure 1:
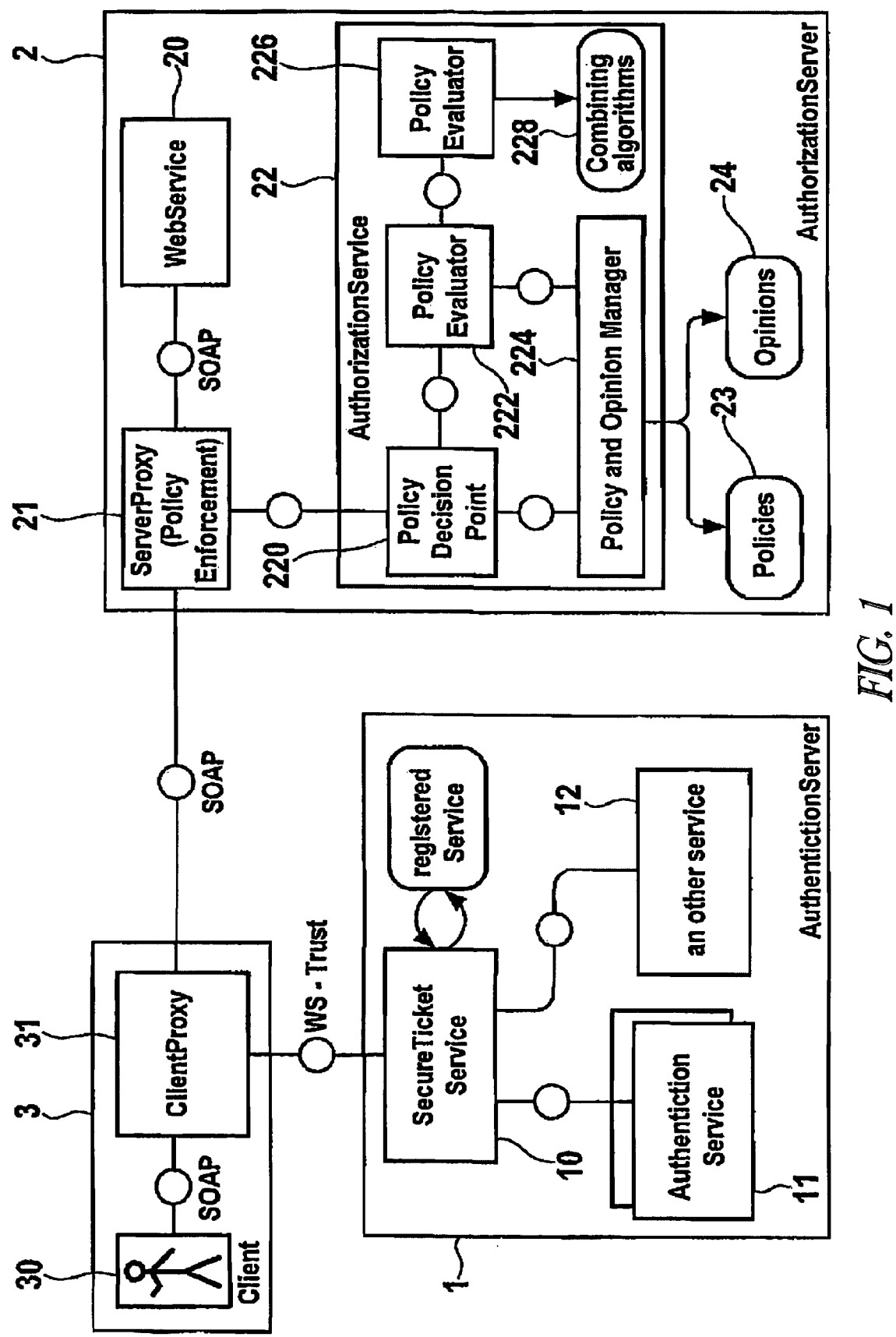
FIG. 1 shows a block diagram of an exemplary (service-oriented) architecture.

FIG. 1 shows an exemplary architecture for an authentication of a user to a server in an authorization process. The architecture may comprise three parts:

(1) An authentication server 1 comprises a trust service 10 such as a security ticket service (STS), an authentication service 11 and (possibly) further services 12. The authentication server 1 deals with aspects of authentication, which may be a trusted server hosting a protected service.

(2) An authorization server 2 comprises a substantially protected service 20 such as a Web service or a resource, a server proxy 21, and an authorization service 22. The server proxy 21 and the authorization service 22 substantially handle an authorization process of an access request to the service 20. One or more policies 23 and one or more opinions 24 on authentication mechanisms, which may be incorporated into the one or more policies 23, are stored in the authorization service 2. Together with the server proxy 21, the authorization service 22 may handle an access request to the service 20 and may either grant or deny access to the service 20. The authorization service 22 comprises a policy decision point 220, a policy evaluator 222, which may have access to a manager 224, and an opinion evaluator 226, which is based on a combining method 228. Theses components of the authorization service 22 decide based on the one or more policies 23 and the one or more opinions 24 on authentication mechanisms, on one or more authentication mechanisms, and on a demanded level of security whether to grant or to deny a request from the user 30 to the service 20.

(3) A client 3 comprises a user 30 such as a service, a client application, or an end user and a client proxy 31. The user 30 initiates an authentication to the authentication process when requesting access to a service 20. The client proxy 31 communicates with both the authorization server 2 and the authentication server 1 in order to enable the user 30 to access the service 20.

In one exemplary aspect, the main components of the architecture shown in FIG. 1 may be the server proxy 21, the client proxy 31, the trust service 10, and the authorization service 22. These components will be described in greater detail in the following:

The client proxy 31 may serve as a gateway for the user 30 to access the protected service 20, which may only accept incoming requests from the server proxy 21. Hence, each request from the user 30 to the protected service 20 has to pass the client and the server proxies 31 and 21. In general, the client and server proxies 31 and 21 are able to accept and forward messages and perform a form of message processing as well. The proxies 31 and 21 are able to cross trusted domains. In particular, the proxies 31 and 21 have to decide whether a message request from the user 30 may cross a trusted domain boundary on the authorization server 2 or whether access is denied. Hence a request message and a response message exchanged between the user 30 to the service 20 are secured by passing them through the proxies 31 and 21. Accordingly, the client proxy adds encryption, integrity checks, and credentials to a request message from the user 30 and the server proxy 21 decrypts, verifies integrity, and verifies authorization of the request message.

In one exemplary aspect, the client proxy 31 provides an interface substantially adapted to access the service 20. The client proxy 31 may contain means such as business logic for processing a list of credentials for the user 30 when receiving an access request message from the user 30. For each description of a required credential in the list of credentials, the client proxy 31 creates a trust-based request such as a WS-request and sends the trust-based request to the trust service 10, which, in turn, sends a security token back to the client proxy 31. If the client proxy 31 does not receive a security token from the trust service 10, it searches for an alternative within the list of credentials. In case no alternative is left, the client proxy 31 fails. Subsequently, the client proxy 31 sends the request message enhanced with the security token from the user 30 to the server proxy 21.

In a further exemplary aspect, the request message may be a SOAP (Simple Object Access Control) message. The secured request message, which contains the security token, may be secured by WS-Security, which may ensure integrity and non-repudiation of the data exchanged by the request message.

Alternatively, XINS, Burlap, XML-RPC, or GXA or a middleware technology such as CORBA may be used as a message protocol instead of SOAP.

The server proxy 21 receives incoming request messages from the user 30 and substantially acts as a policy enforcement point. The server proxy 21 may be substantially a counterpart to the client proxy 31 for applying security on the exchanged messages. Before the service 20 is called, the server proxy 21 connects to the authorization service 22 which ensures that the user 30 is allowed to access the requested service 20. A message request from the user 30 is checked by the server proxy 21, which substantially ensures that at least one policy 23 of the service 20 is enforced. The server proxy may not decide whether the conditions comprised in the policy 23 are fulfilled by the user 30 for a certain request. For this purpose, the server proxy 21 contacts the authorization service 22.

In one exemplary aspect, the policy 23 may be an XACML (eXtensible Access Control Markup Language) policy. An XACML policy comprises a set of access control rules, wherein each rule is described by a 3-tuple of a subject (e.g. a client application or a user such as user 30), an action (e.g. a service method) to be performed on a resource (e.g. a service, a file, a database such as server 20).

Alternatively, WSPL, PSPL, TPL, X-Sec, or KeyNote may be used as a policy language instead of XACML.

The authorization service 22 substantially decides whether to grant or to deny access to a protected service 20 requested from a user 30 based on the list of credentials sent by the user 30. In a first operation, a request message from the user 30 is converted into a request, which is expressed in the same language as the policy 23.

In one exemplary aspect, the request message may be a SOAP message which may be converted into an XACML request using XSLT (XSL Transformations). The request is internally (i.e. within the authorization service 22) sent to the policy decision point 220 of the authorization service 22.

More specifically, the policy decision point 220 decides whether to grant the request by the user 30 for one or more actions to be performed on the service 20 based on given evidence, i.e. a list of credentials provided with the request. As already described previously, the evidence may be provided by the trust service 31, which may be responsible for creating, recreating, and validating of credentials. The policy decision point evaluates by requesting the policy evaluator 222 the request against the policy 23 and checks whether the request for the user 30 complies with the access control rules defined in the policy 23. Furthermore, the request is checked against the policy 23 in view of one or more opinions 24 on at least one instance of at least one authentication mechanism available for the user and decides whether a demanded security level for the service 20 can be achieved by the user 30.

(Trust) Opinions 24 may be expressed in terms of security levels on instances of authentication mechanisms. The demanded security level may be reached by any combination of any of the instances of authentication mechanisms, each attached with a security level, provided by the user 30, wherein the security levels of the instances of authentication mechanisms are combined. Combination of instances of authentication mechanisms based on their security levels may be performed by the opinion evaluator 226.

In one exemplary aspect, the authorization service 22 stores all policies 24 and extracts on request a list of required credentials from the policies 24 to inform the user 30 which credentials the user 30 has to provide to the authorization service 22. The list of required credentials may be extracted and provided by the policy evaluator 222.

The trust service 10 such as a security ticket service (STS) substantially forms a basis of trust by issuing security tokens such as a SAML (Security Assertion Markup Language) authentication token for the user 30. A security token may identify the user 30, the name and the URI (Unified Resource Identifier) of the authentication service 11, a validity time and/or an expiration date of the security token and possibly additional information. The security token may be used by the user to request access to the service 20. Before the trust service 10 may issue any assertions about authentication of the user 30, the trust service 10 needs to perform authentication. For this purpose, the trust service 10 delegates the authentication operation to at least one trusted authentication service 11, which is registered in the trust service 10.

In one exemplary aspect, the architecture of FIG. 1 is based on a service-oriented approach, wherein each component may be realized as a Web service, each of which providing specific operations to the outside. Furthermore, communication among components may be configured in at least one corresponding configuration file. Accordingly, an implementation of at least one component of the architecture may be easily replaced by an alternative implementation.

It should be understood that according to the architecture shown in FIG. 1, one or more services acting both as service 20 and as user 30 may be implemented on various distributed platforms and may be accessed across networks. Hence, reuse of services may be improved.

In one example, a user 30 and a service 20 are linked on demand to achieve a desired result such as responding to a request to be performed on the service 20 send from the user 30 to the service 20 via client and server proxies 31 and 21.

In one exemplary aspect, the architecture shown in FIG. 1 may be realized in a ubiquitous computing environment, wherein the client 3 may be any (mobile) device such as a notebook, a handheld, a PC, or a mobile phone. Depending on the device of the client 3, the client may have different capabilities for authentication at an authorization server 2 when requesting access to a protected service 20. That means, depending on the (mobile) device, the client 3 may support different instances of authentication mechanisms.

In a conventional authorization process, a protected service 20 may usually demand for a specific authentication mechanism. For example, a protected service 20 demands using as an authentication mechanism a fingerprint mechanism of a user 30 in order to authenticate. A user 30 using a notebook may be aware of a fingerprint mechanism. However, if a user 30 using a mobile phone requesting access to the protected service, the user 30 may be not able to access, because the mobile phone, which only offers text- and image-based interfaces, might be not aware of a fingerprint mechanism, i.e. might be not appropriate to authentication the user 30 at the service 20. In particular, if a service 20 requires strong means for authentication, small mobile devices may not be suitable. Hence, for a user 30 operating on a small mobile device, it becomes impossible to access the protected service 20.

In order to overcome such drawbacks, in an exemplary authorization process for the architecture shown in FIG. 1, a protected service 20 does not required a particular authentication mechanism. Rather, the authorization service 22, which handles access to the protected service 20, defines a demanded level of security rather than an expected authentication mechanism. In addition, each instance of one or more authentication mechanisms is provided with a security level, which is defined in opinions 24 in addition to at least one policy 23.

Figure 2:
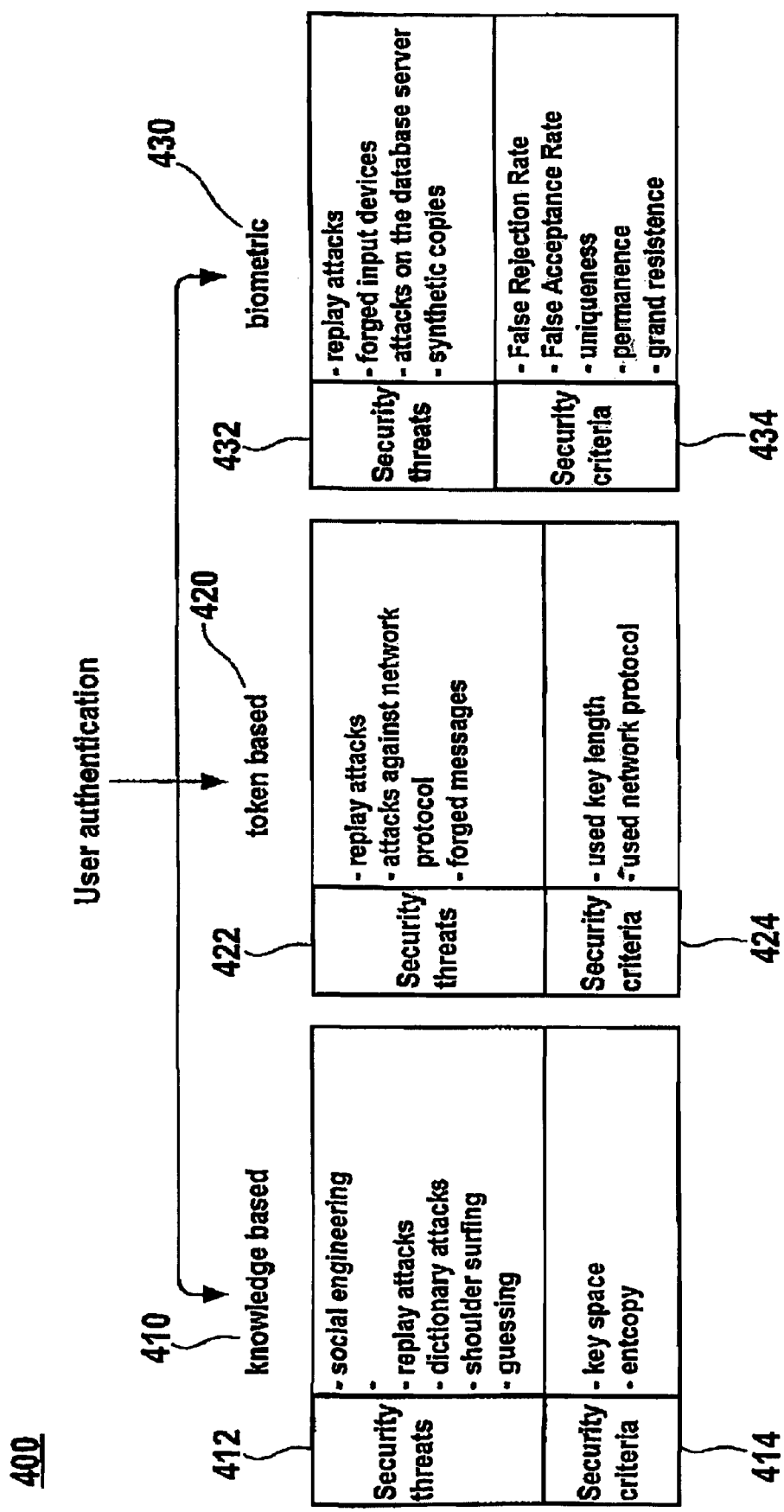
FIG. 2 shows a block diagram of an exemplary classification of authentication mechanisms.

FIG. 2 shows an exemplary classification of authentication mechanisms 400 in use for authentication when access to a protected service or resource is requested. In general, authentication mechanisms may be classified into three categories, knowledge-based 410, token-based 420, and biometric 430. Knowledge-based authentication 410 may be based on something only two parties participating in an authentication process know. An example of a knowledge-based authentication mechanism 410 is a password-based mechanism. Token-based authentication 420 is based on an object such as a token that a user needs to possess to be authenticated successfully. Examples of token-based authentication 420 are a smart-card and a key-based mechanism. Biometric-based authentication 430 is based on uniqueness of an identity of a user. Examples of biometric-based authentication 430 are a fingerprint or a voice scan of a person. Each authentication mechanism depends on certain criteria 414, 424, and 434, which may have relevant impact on the security. For example, a password-based mechanism has a certain criteria concerning the length of a password. Each of the three categories comprises at least one security threat 412, 422, and 432 and at least one security criterion 414, 424, and 434. Security threats 412, 422, and 432 refer to possible attacks to an instance of an authentication mechanism. For example, knowledge-based mechanisms 410 are vulnerable to social engineering, spoofing and masquerading, to mention only a few security threats 412. Hence, security of knowledge-based mechanisms 410 highly depends on a user himself/herself and his decision whom and when to reveal his/her password, for example.

In one exemplary aspect, an authentication mechanism such as a password mechanism or a key mechanism is considered as a class whose members, which are referred to as instances of authentication mechanisms, are concrete ways to authenticate such as a password-based mechanism with passwords of length 10 signs or a X.509 key-based mechanism with a key of a specific length and a specific certification process.

Since in one exemplary aspect, the authorization service 22 rather requires a demanded level of secure to access the service 20 than a particular authentication mechanism or a particular instance of an authentication mechanism, each instance of each authentication mechanism, which may be provided by the user 30 to the service 30, needs to be measured in terms of its security. Hence, trust on each instance of each authentication mechanisms needs to be represented. Furthermore, in one exemplary aspect, it becomes necessary to combine at least two instances of at least one or at least two different authentication mechanisms in order to achieve the demanded level of security.

In different approaches to represent a metric of trust, trust has been either represented as a discrete or as a continuous parameter in the range [0,1], i.e. in the closed interval between 0 and 1. Discrete approaches may not be adequate to be used in an authorization process according to the present description, because discrete approaches to represent trust only provide a finite small set of possible trust values. Purely continuous and probability oriented models may also not be adequate to be used in an authorization process according to the present description, because suggested operators for combining trust values often seem to be counterintuitive. Hence, by modeling trust as probability, important aspects of trust are missing. In particular, the perception of security provided by an instance of an authentication mechanism, i.e. trust into an instance of an authentication mechanism may highly depend on beliefs and experiences of a user 30. Therefore, it may not be possible to assume that each user 30 of a plurality of users has the same trust in an instance of an authentication mechanism.

In one exemplary aspect to represent a subjective belief, a concept of opinion may be used, which extends classical probabilities by taking a certain uncertainty about a proposition into account. The uncertainty may reflect the imperfect, subjective knowledge that a user 30 may have about an instance of an authentication mechanism. Hence, a level of security of an instance of an authentication mechanism may be expressed in terms of an opinion. In order to achieve a demanded level of security, which is expected by an authorization service 22 to access a protected service 20, logical operators for combining opinions according to subjective logic may be used. Expressing a level of security in terms of opinions and using subjective logic operators to combine opinions in order to reach a demanded level of security, a service 20 does not need to expect to certain authentication mechanism to authenticate in order to access the service 20. Rather, a user 30 may provide an authorization service 22, which states a demanded level of security to access the service 20, with at least one instance of an authentication mechanisms or a combination of at least two different instances of at least one authentication mechanism or of at least two different authentication mechanisms (i.e. by combining security level opinions of the instances using subjective logic operators). In order to check, whether access is granted, the demanded level of security is compared to the possibly combined level of security of the instance(s) provided by the user 30. In this way, neither the authorization service 20 nor the user 30 may consider certain authentication mechanisms and/or certain instances of authentication mechanisms in order to authenticate. Hence, a user 30 tends to reach a demanded security level based on a (subjective) opinion logic.

In an alternative exemplary aspect, a level of security of an authentication mechanism and/or an instance of an authentication mechanism may be expressed in terms of reputation. That means, a level of security is based on previous experiences with an authentication mechanism and/or an instance of an authentication mechanism. Accordingly, reputation is based on the collection of evidence of good and bad behaviors. In this exemplary aspect, an authentication mechanism and/or an instance of an authentication mechanism is associated to a reputation which evolves depending on its bad and good behaviors.

In yet an alternative exemplary aspect, a level of security of an authentication mechanism and/or an instance of an authentication mechanism may be expressed in terms of fuzziness. That means, a level of security is based on an uncertainty. In this exemplary aspect, an authentication mechanism and/or an instance of an authentication mechanism is associated with a probability including an uncertainty expressed in terms of fuzzy logic.

It should be noted that assigning a level of security to an instance of an authentication mechanism and not to the authentication mechanism itself allows for a finer grained expression of opinion on security. Accordingly, it becomes possible to assign a level of security to an authentication mechanism itself as well as to at least one instance of this authentication mechanism. Hence, an instance not having a level of security assigned would inherit the level of security of its class, i.e. the authentication mechanism of which the instance is a member. And if an instance has an assigned level of security, the level of security of the authentication mechanism of which the instance is a member may be combined with the security level of the instance in order to obtain a better approximation of a subjective opinion on this instance.

In the following, an exemplary authentication process for authenticating a user 30 at an authorization service 22 in order to grant or deny access to a protected service 20 for which access is requested according to FIGS. 3 to 9 is described.

In one exemplary aspect, the authentication process may comprise the following operations:

A user 30 located on a client device such as a mobile phone, a handheld, a PDA, a notebook, or a personal computer requests access to a protected service 20, wherein the request is intercepted by a client proxy 31 (S0, S1).

The client proxy 31 requests an authorization server 2 for required credentials to access the service 30, wherein a credential comprises an authentication mechanisms an additional information to the authentication, which identifies an instance of the authentication mechanism, and a security level attached to the authentication mechanism. Accordingly, a credential may be use to authenticate the user 30 at the authorization server 2 in order to access the requested service 20, wherein the request is intercepted by a server proxy 21 (S2). Furthermore, the required credentials may comprise a list of credential combinations, which may achieve a demanded level of security.

The client proxy 31 acquires the required credentials form a trust service 10 such as a security ticket service, wherein the trust service 10 tries to find an appropriate list of credentials according to at least one credential combination suggested by the server proxy 21, which reaches the demanded level of security (S3).

The trust service 10 finds an appropriate authentication service 11 and sends a request for authentication of the user 30 to the authorization server 2, wherein the authentication service 11 performs authentication of the user 30 and creates at least one assertion such a security token according to the list of credentials provided by the user 30, which is send back to the trust service 10.

The trust service 10 issues the security token and returns it to the client proxy 31.

The request message is enhanced with the security token and send to the authorization server 2.

An authorization service 22, which may be located on the authorization service 2 checks whether the received credentials, i.e. whether the security token comply with a policy 23 and grants or denies access to the service 20 (S5).

Figure 3:
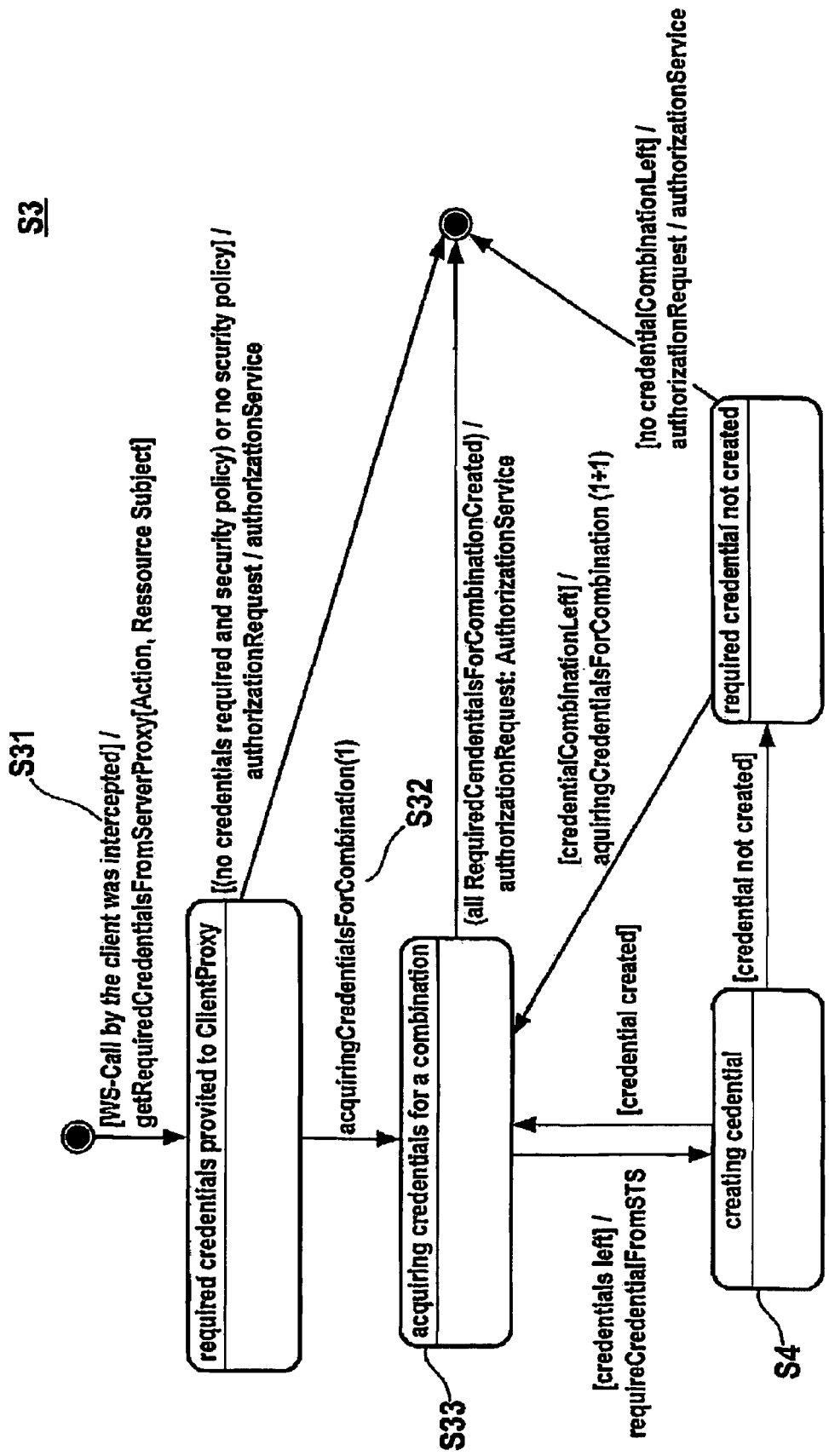
FIG. 3 shows a state diagram of an exemplary implementation of access control.

In one exemplary aspect, a client proxy 31 and a server proxy 21 substantially located in an authorization server 2 communicate via a specific protocol substantially to find out which instances of authentication mechanisms are available on the client 3 comprising a user 30 requesting access to a protected service 20 (S0) and in at least one policy 23. The client 3 may be any device such as a notebook, a handheld, a PC, or a mobile phone possibly provided with different instances of possibly different authentication mechanisms. This protocol may comprise the following operations as shown in FIG. 3:

The client proxy 31 requests a required list of credential combinations from the server proxy 21 (S31), wherein the required list of credential combinations comprises sets of one or more credentials in terms of instances of authentication mechanisms having a security level attached and wherein each credential combination would reach a demanded level of security.

The client proxy 31 receives the list of required credential combinations and processes the list of required credential combinations and tries to acquire all required credentials (S32). Within this operation, the client proxy 31 communicates with a trust service 10 substantially located on an authentication server 1 to acquire at least one of the required credential combinations (S33). This communication may be a WS-Trust communication.

The client proxy 31 calls the server proxy 21 again to request access to the protected service 20, wherein the request comprises the requested credentials (S4).

Figure 4:
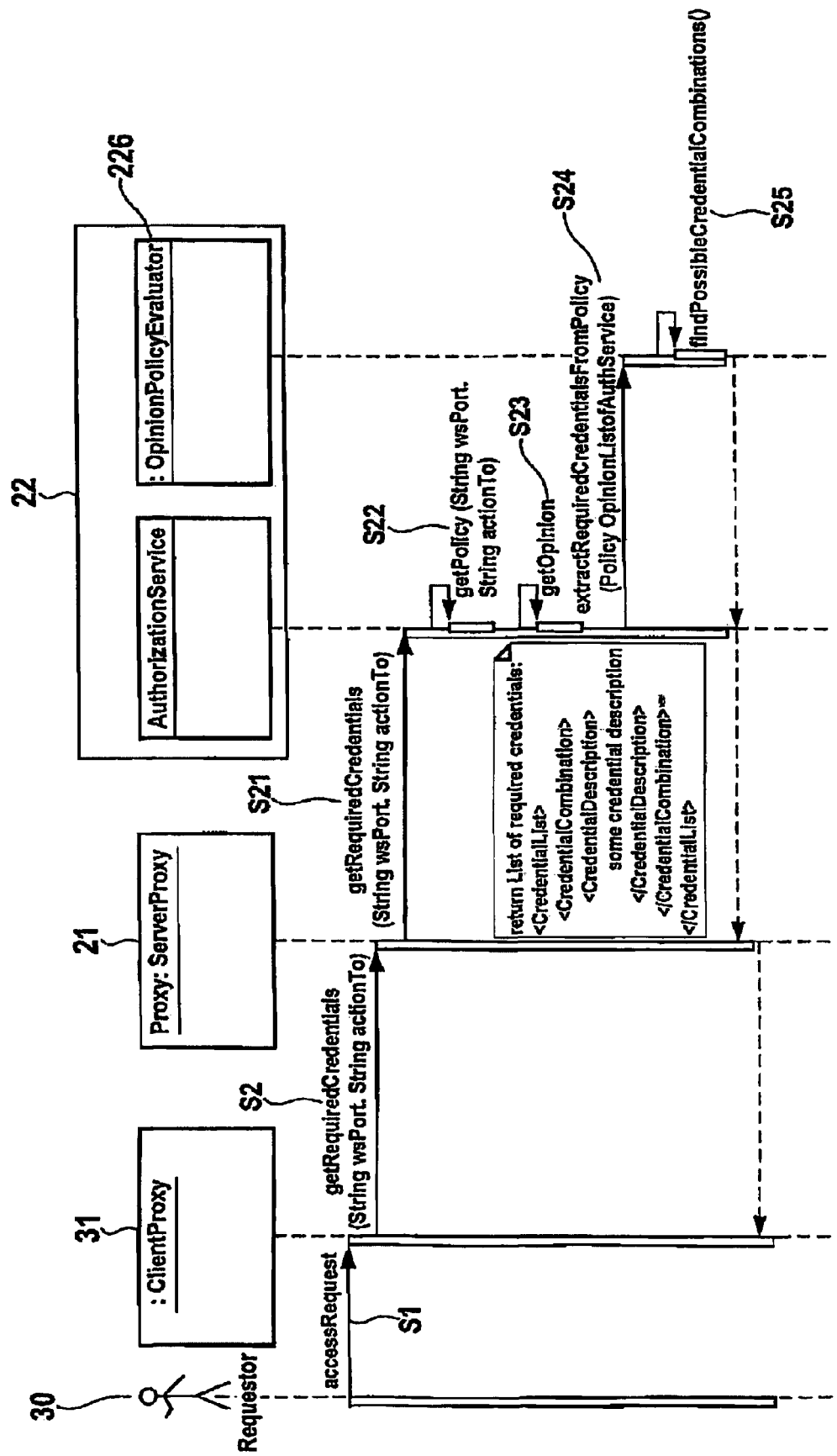
FIG. 4 shows a flow diagram of an exemplary acquisition of a credential list.

The authorization service 22 defines a demanded level of security, which needs to be reached by the user requesting access to the protected service 20. In particular, acquisition of the demanded level of security is based on an action that should be performed on the service 20. In one exemplary aspect, a demanded level of security is defined in the policy 23 depending on a 3-tuple subject (i.e. the user 30 requesting access to the service 20), action (i.e. at least one action the user 30 wants to perform on the service 20), and resource (i.e. the service 30 itself). Accordingly, as shown in FIG. 4, the server proxy 21 asks the authorization service 22 for the demanded level of security for the 2-tuple action and resource (S21). The authorization service 22 forwards this request to a policy decision point 220, which parses the policy 23 (S22) and an opinion policy 24 (S23). The opinion policy 24 comprises a plurality of credentials comprising a security level such as an opinion, a reputation, or a fuzzy value on a probability. According to a demanded level of security a list of credential combinations 500 is computed (S24), i.e. a list of possible combinations of instances of authentication mechanisms reaching the demanded level of security, and sent back to the server proxy 21 (S25) and forwarded to the client proxy 31.

In one exemplary aspect, the list of credential combinations 500 is generated by an opinion evaluator 226 based on the demanded level of security and on the opinion policy 24 and 600, which defines a security level such as an opinion, a reputation, or a fuzzy value on a probability on each of the instances of authentication mechanisms.

According to the exemplary list of credentials 500 shown in FIG. 5, the user 30 may either deliver a proof of authentication with a password mechanism 512 and an x509 certificate 514 according to a first credential combination 510 or an x509 certificate 522 and a fingerprint mechanism 524 according to a second credential combination 520. Not that for the password mechanism 512 a minimum password length has to be included in a credential list issued by the user 30 while for the x509 certificate an issuer is demanded as additional information about the authentication process included in the credential list issued by the user 30.

Figure 6:
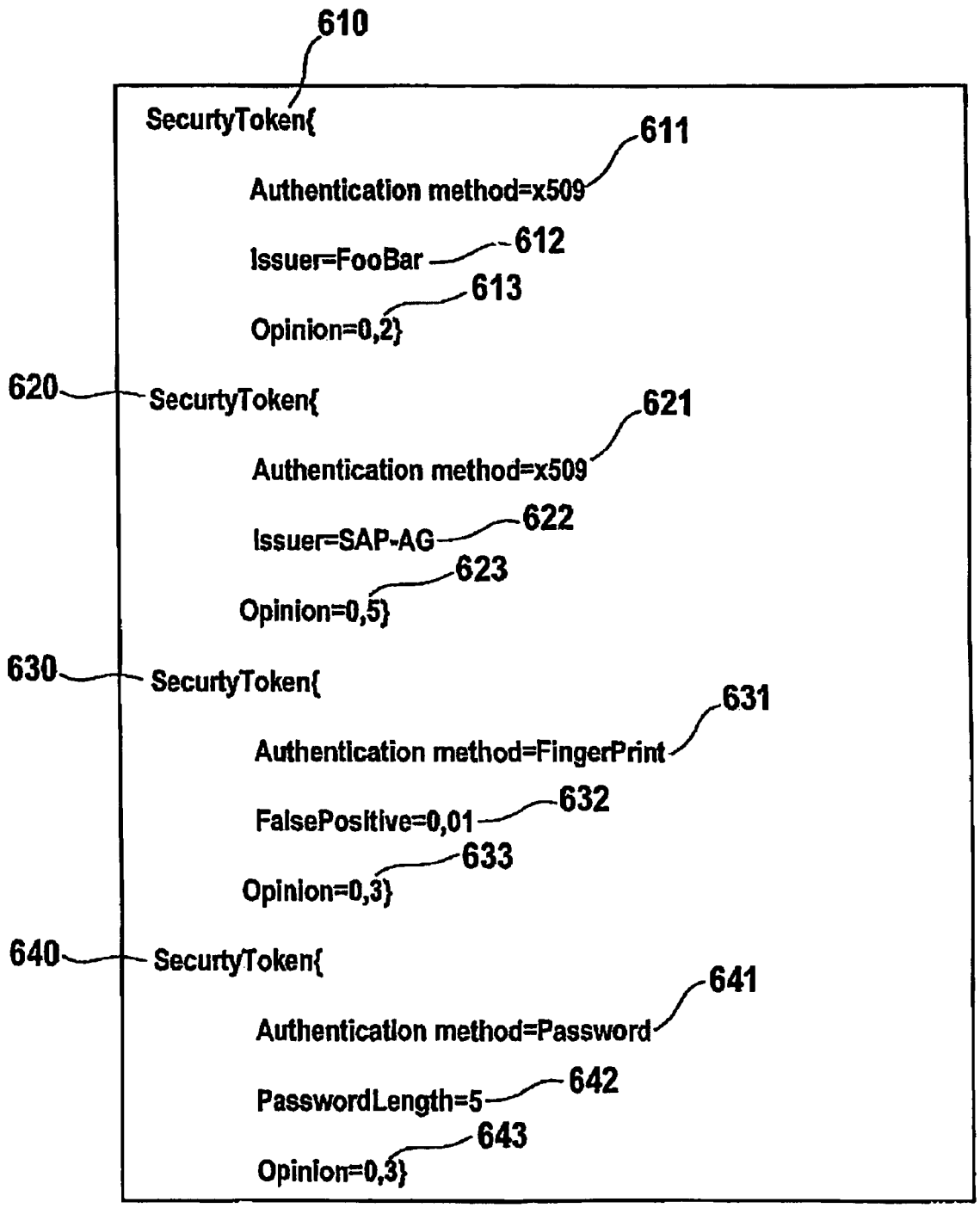
FIG. 6 shows an exemplary opinion policy.

According to the exemplary opinion policy 600 shown in FIG. 6, each credential 610, 620, 630, and 640 of the opinion policy 600 comprises an authentication mechanism 611, 621, 631, and 641 at least an additional information 611, 621, 631, and 641 on the corresponding authentication mechanism 611, 621, 631, and 641, which defines an instances of said corresponding mechanism, and a security level 613, 623, 633, and 643 such as an opinion, in case security is expressed in terms of subjective logic. For example, credential 620 refers to an x509 mechanism having the additional information that the issuer is SAP-AG, i.e. the credential 620 refers to an instance of x509 mechanism with issuer SAP-AG. The security level 623 is 0,5. In a second example, credential 640 refers to a password mechanism 641 having password length 5 characters 642, i.e. the credential 640 refers to an instance of password having password length 5 characters. The security level 643 of the credential 640 is 0,3. Accordingly, credential 620 has a higher security level than credential 640.

Accordingly, if the demanded level of security is 0,5, it may be sufficient to provide merely credential 620 for authentication. However, if the demanded level of security is 0,7, it becomes necessary to combine any of the credentials 610, 620, 630, and/or 640 in order to reach the demanded level of security and provide a combination for authentication, accordingly.

Figure 7:
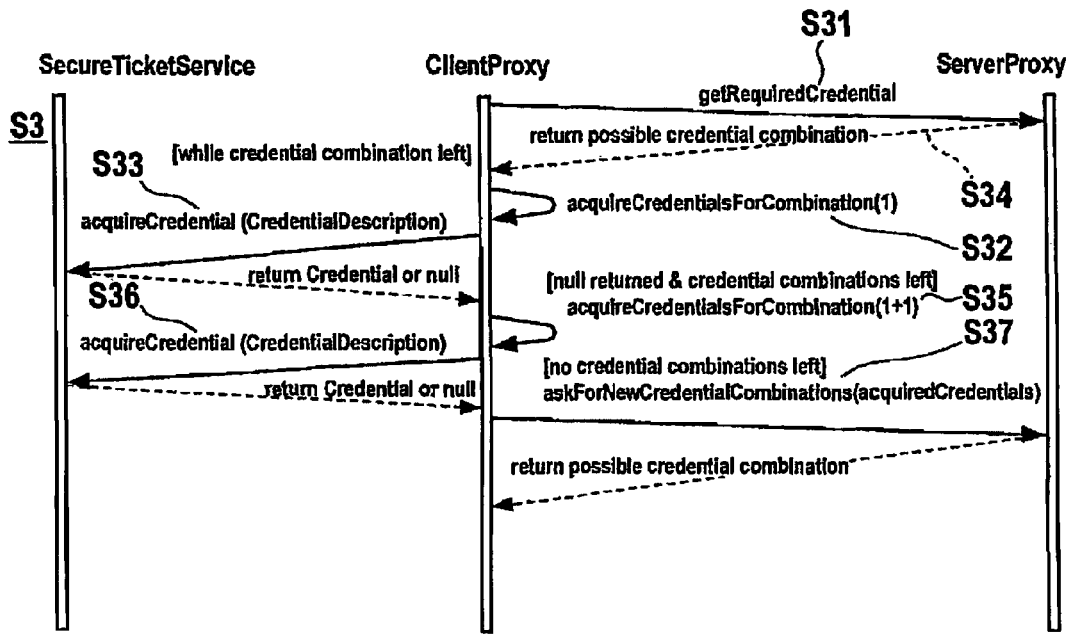
FIG. 7 shows a flow diagram of an exemplary credential acquisition from a trust service.

In one exemplary aspect, the client proxy 31 cares to compute a suitable combination of credentials in order to reach the demanded level of security. As shown in FIG. 7, after having received a first possible credential combination (S31) from the server proxy 21, the client proxy 31 acquires a first list of credentials for the first combination (S32) and acquires a credential list, i.e. a list of security tokens from the trust service 10 (S33) for the user 30. If the trust service 10 is not able to return a valid combination of credentials, the client proxy 31 tries a next possible credential combination from the list of credential combinations 500 received from the server proxy 21 until the client proxy 21 receives a valid list of credentials or until any possible credential combination has been tried and failed (S35, S36, S37). If the client proxy 21 has received a valid combination of credentials which meets the requirements of the list of possible credential combinations 500 received from the server proxy in accordance with the demanded level of security, the client proxy 31 enhances the request from the user 30 to the service 20 with the acquired list of credentials received from the trust service 10 and sends the enhanced request back to the server proxy 21.

Figure 8:
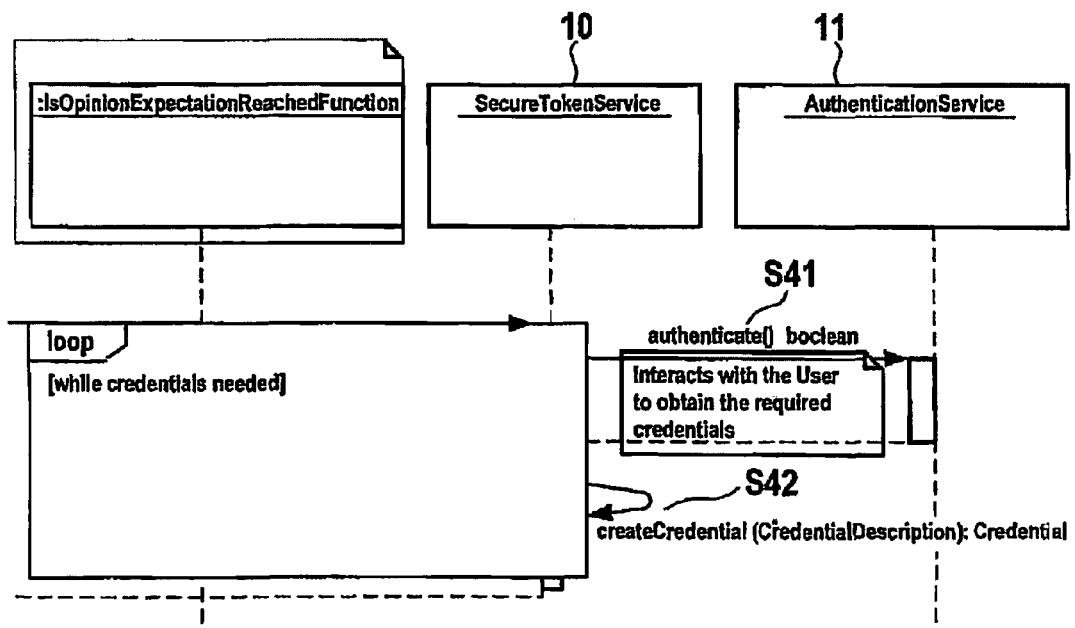
FIG. 8 shows a flow diagram of an exemplary credential acquisition from an authorization service.

As shown in FIG. 8, according to create a credential (S42) and/or a list of credentials (S4) for the user, the trust service 10 acquires an authentication proof from the authentication service 11 by authenticating the user 30 at the authentication service 11 (S41), wherein the user 30 sends the required credentials to the trust service 10.

Figure 9:
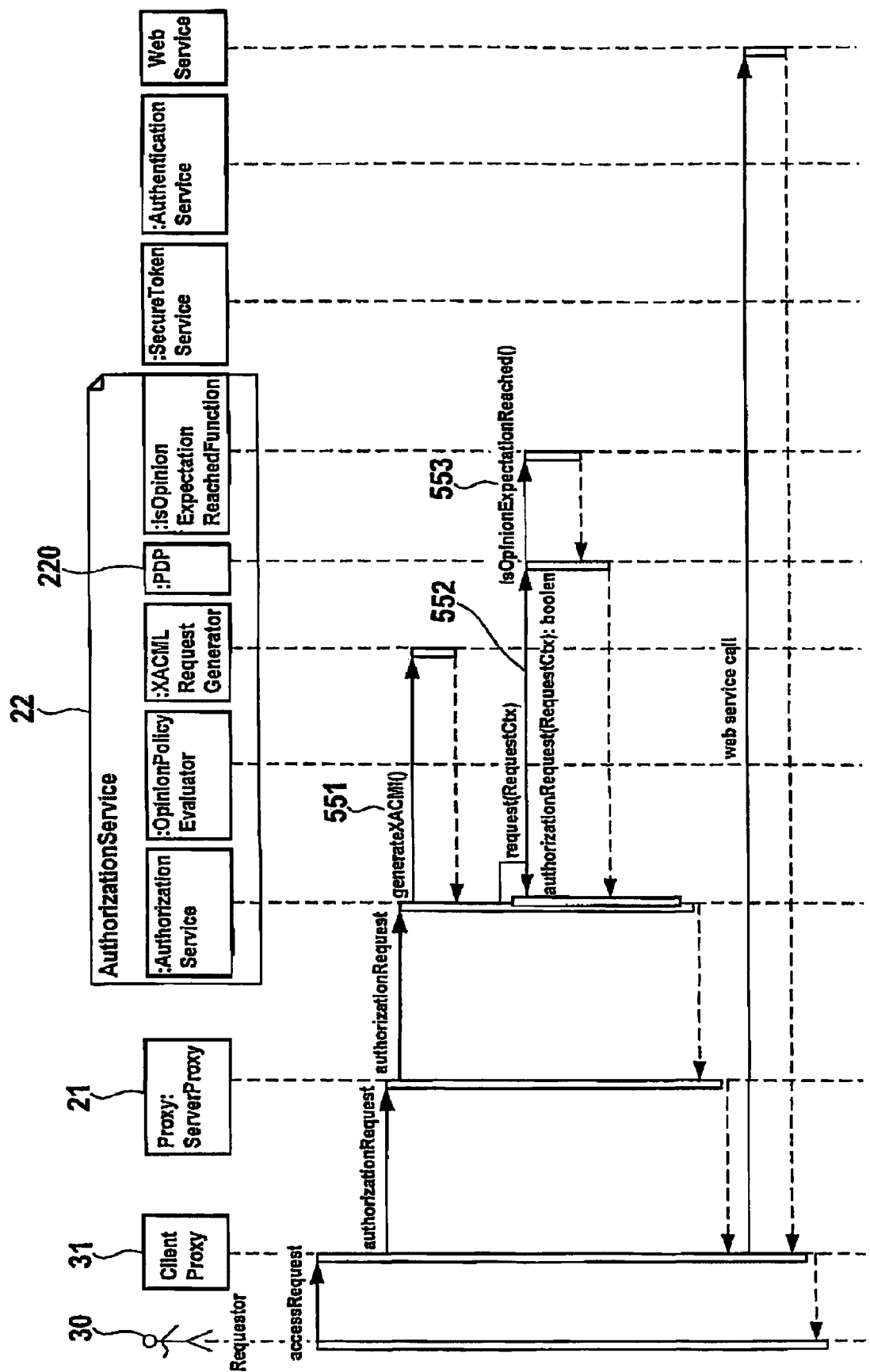
FIG. 9 shows a flow diagram of an exemplary access control policy enforcement.

In case, the client proxy has received a valid list of credentials from the trust service 10 according to the proposed possible credential combinations from the user 30, the client proxy 31 forwards the list of credentials generated by the trust service 10 to the server proxy 21. The server proxy 21 asks the authorization service 22 to enforce the policy 23 (S51). Accordingly, the policy decision point 220 checks the credentials and grants or denies access to the service 20 for a requested action (S52, S53) as shown in FIG. 9.

The authentication process as exemplary described above may be used in file sharing. In traditional authentication processes, a user 30 has to authenticate himself using a unique authentication mechanism demanded by an authorization service 22 in order to access a protected file 20. According to the above description, the user 30 may authenticate himself by a combination of instances of authentication mechanisms available for a client device 3 used.

Figure 10:
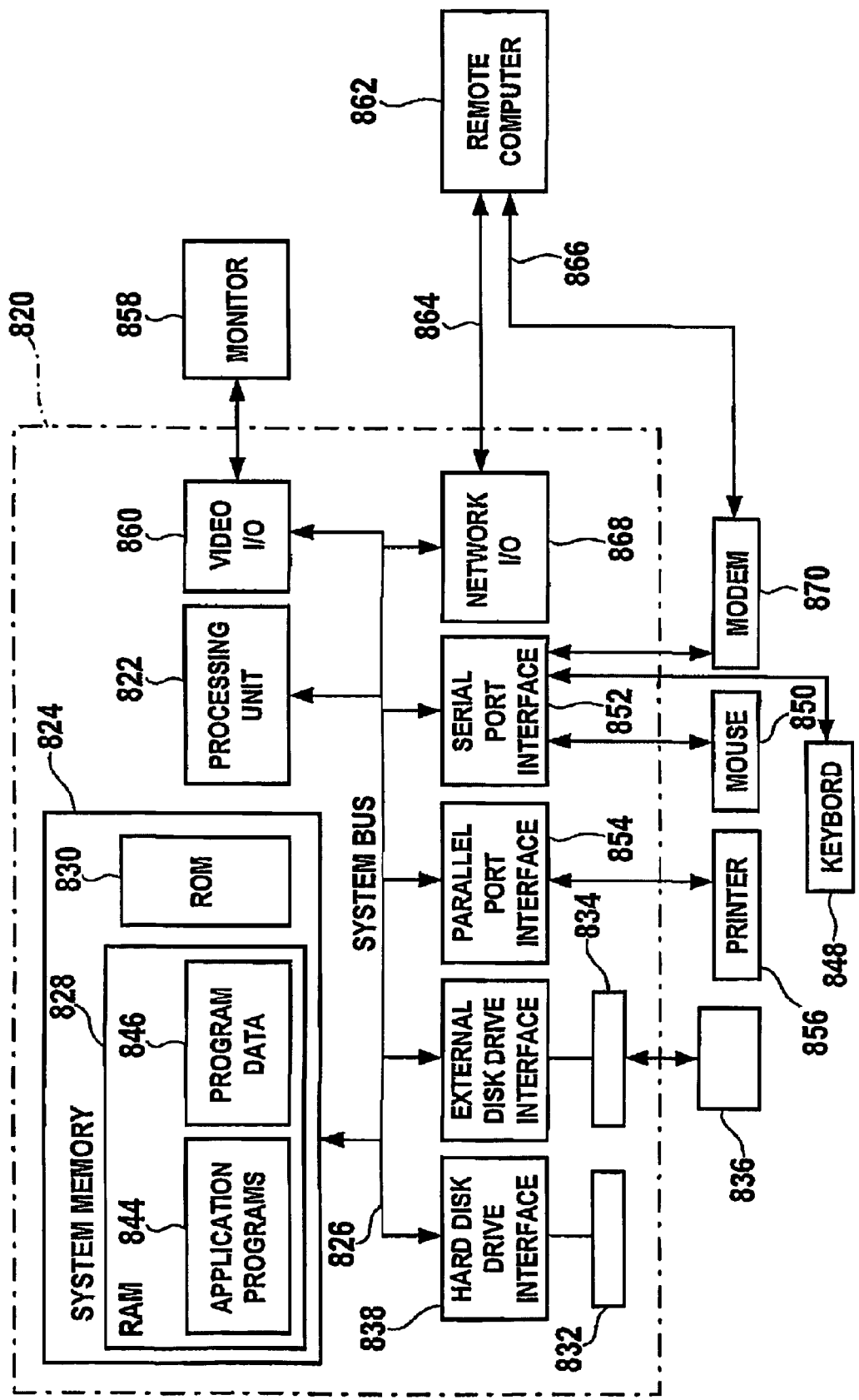
FIG. 10 shows an exemplary computer (network) system.

With reference to FIG. 10, an exemplary system for implementation may include a general purpose computing device in the form of a conventional computing environment 820 (e.g. personal computer), including a processing unit 822, a system memory 824, and a system bus 826, that couples various system components including the system memory 824 to the processing unit 822. The processing unit 822 may perform arithmetic, logic and/or control operations by accessing system memory 824. The system memory 824 may store information and/or instructions for use in combination with processing unit 822. The system memory 824 may include volatile and non-volatile memory, such as random access memory (RAM) 828 and read only memory (ROM) 830. A basic input/output system (BIOS) containing the basic routines that helps to transfer information between elements within the personal computer 820, such as during start-up, may be stored in ROM 830. The system bus 826 may be any of several types of bus structures including a memory bus or memory controller, a peripheral bus, and a local bus using any of a variety of bus architectures.

The personal computer 820 may further include a hard disk drive 832 for reading from and writing to a hard disk (not shown), and an external disk drive 834 for reading from or writing to a removable disk 836. The removable disk may be a magnetic disk for a magnetic disk driver or an optical disk such as a CD ROM for an optical disk drive. The hard disk drive 834 and external disk drive 834 are connected to the system bus 826 by a hard disk drive interface 838 and an external disk drive interface 840, respectively. The drives and their associated computer-readable media provide nonvolatile storage of computer readable instructions, data structures, program modules and other data for the personal computer 820. The data structures may include relevant data of the implementation of the method for access control, as described in more above below. The relevant data may be organized in a database, for example a relational or object database.

Although the exemplary environment described herein employs a hard disk (not shown) and an external disk 842, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 842, ROM 830 or RAM 828, including an operating system (not shown), one or more application programs 844, other program modules (not shown), and program data 846. The application programs may include at least a part of the functionality as detailed in FIGS. 1 to 7.

A user may enter commands and information, as discussed below, into the personal computer 820 through input devices such as keyboard 848 and mouse 850. Other input devices (not shown) may include a microphone (or other sensors), joystick, game pad, scanner, or the like. These and other input devices may be connected to the processing unit 822 through a serial port interface 852 that is coupled to the system bus 826, or may be collected by other interfaces, such as a parallel port interface 854, game port or a universal serial bus (USB). Further, information may be printed using printer 856. The printer 856, and other parallel input/output devices may be connected to the processing unit 822 through parallel port interface 854. A monitor 858 or other type of display device is also connected to the system bus 826 via an interface, such as a video input/output 860. In addition to the monitor, computing environment 820 may include other peripheral output devices (not shown), such as speakers or other audible output.

The computing environment 820 may communicate with other electronic devices such as a computer, telephone (wired or wireless), personal digital assistant, television, or the like. To communicate, the computer environment 820 may operate in a networked environment using connections to one or more electronic devices. FIG. 10 depicts the computer environment networked with remote computer 862. The remote computer 862 may be another computing environment such as a server, a router, a network PC, a peer device or other common network node, and may include many or all of the elements described above relative to the computing environment 820. The logical connections depicted in FIG. 10 include a local area network (LAN) 864 and a wide area network (WAN) 866. Such networking environments are commonplace in offices, enterprise-wide computer networks, intranets and the Internet.

When used in a LAN networking environment, the computing environment 820 may be connected to the LAN 864 through a network I/O 868. When used in a WAN networking environment, the computing environment 820 may include a modem 870 or other means for establishing communications over the WAN 866. The modem 870, which may be internal or external to computing environment 820, is connected to the system bus 826 via the serial port interface 852. In a networked environment, program modules depicted relative to the computing environment 820, or portions thereof, may be stored in a remote memory storage device resident on or accessible to remote computer 862. Furthermore other data relevant to the application of the insurance claim management evaluation method (described in more detail further below) may be resident on or accessible via the remote computer 862. The data may be stored for example in an object or a relation database. It will be appreciated that the network connections shown are exemplary and other means of establishing a communications link between the electronic devices may be used.

The above-described computing system is only one example of the type of computing system that may be used to implement the method, system, and computer program product for access control according to the claims.

A number of examples and implementations have been described. Other examples and implementations may, in particular, comprise one or more of the above features. Nevertheless, it will be understood that various modifications may be made. Accordingly, other implementations are within the scope of the following claims.

List of Reference Numerals
1 authentication server
10 trust service
11 authentication service
12 further services
2 authorization server
20 service
21 server proxy
22 authorization service
220 policy decision point
222 policy evaluator
224 manager
226 opinion evaluator
226 combining method
23 policy
24;600 opinion policy
3 client
30 user
31 client proxy
400 classification of authentication mechanisms
410 knowledge-based authentication
420 token-based authentication
430 biometric authentication
412, 422, 432 security threads
414, 424, 434 security criteria
500 list of credential combinations
510, 520 credential combination
820 conventional computing environment
822 processing unit
824 system memory
826 system bus
828 random access memory (RAM)
830 read only memory (ROM)
832 hard disk drive
834 external disk drive
836 removable disk
838 hard disk drive interface
840 external disk drive interface
842 external disk
844 one or more application programs
846 program data
848 keyboard
850 mouse
852 serial port interface
854 parallel port interface
856 printer
858 monitor
860 video input/output
862 remote computer
864 local area network (LAN)
866 wide area network (WAN)
868 network I/O
870 modem

What is claimed is:

1. A computer-implemented method for authentication, the method comprising:
   defining a demanded level of security in a server, the demanded level of security defining a minimum level of trust necessary to allow a request, wherein the demanded level of security is defined independent of any particular authentication instance;
   providing security levels for each of at least three authentication instances, each security level representing a level of trust in the corresponding authentication instance;
   receiving at least one request sent from a client to the server, the request comprising information verifying that the client has successfully authenticated using at least two of the at least three authentication instances, the at least two of the at least three authentication instances selected by the client from the at least three authentication instances;
   combining the at least two security levels which correspond to the at least two of the at least three authentication instances selected by the client by applying one or more combining operators to the at least two security levels, wherein the at least two security levels are different; and
   allowing the request if the combined at least two security levels exceeds the demanded level of security.

2. A method according to claim 1, wherein the security level for at least one of the authentication instances selected by the client is at least in part based on a trust opinion.

3. A method according to claim 2, wherein the trust opinion comprises an objective criteria and a subjective criteria.

4. A method according to claim 2, wherein the trust opinion is expressed in subjective logic.

5. A method according to claim 1, wherein the one or more combining operators are operators of subjective logic.

6. A non-transitory computer-readable medium that stores instructions which when performed by a machine, causes the machine to perform operations comprising:
   defining a demanded level of security in an authorization service of a server, the demanded level of security defining a minimum level of trust necessary to allow a request, wherein the demanded level of security is defined independent of any particular authentication instance;
   providing security levels for each of at least three authentication instances, each security level representing a level of trust in the corresponding authentication instance;
      receiving at least one request sent from a client to the server, the request comprising information verifying that the client has successfully authenticated using at least two of the at least three authentication instances, the at least two of the at least three authentication instances selected by the client from the plurality of authentication instances;
      combining the at least two security levels which correspond to the at least two of the at least three authentication instances selected by the client by applying one or more combining operators on the at least two security levels, wherein the at least two security levels are different; and
      allowing the request if the combined at least two security levels exceeds the demanded level of security.

7. A system for authentication comprising:
   a memory to store:
      a defined demanded level of security, the demanded level of security defining a minimum level of trust necessary to allow a request, wherein the demanded level of security is defined independent of any particular authentication instance, and
      a security level for each of at least three authentication instances,
      each security level representing a level of trust in that authentication instance; and
   a server comprising a computer processor programmed to execute an authorization service;
   wherein the authorization service is operable to:
      receive at least one request sent from a client comprising information verifying that the client has successfully authenticated using at least two of the at least three authentication instances, the at least two of the plurality of authentication instances selected by the client from the at least three authentication instances;
      combine the at least two security levels which correspond to the at least two of the at least three authentication instances selected by the client by applying one or more combining operators to the at least two security levels, wherein the at least two security levels are different; and
      allowing the request if the combined at least two security levels exceeds the demanded level of security.

8. A system according to claim 7, wherein the security level for one of the authentication instances selected by the client is at least in part based on a trust opinion.

9. A system according to claim 8, wherein the trust opinion comprises an objective criteria and a subjective criteria.

10. A system according to claim 8, wherein the trust opinion is expressed in subjective logic.

11. A system according to claim 7, wherein the one or more combining operators are operators of subjective logic.

12. A method according to claim 1, wherein the security level for one of the authentication instances selected by the client includes an uncertainty expressed in terms of fuzzy logic.

13. A method according to claim 12, wherein the one or more combining operators are fuzzy logic operators.

14. A system according to claim 7, wherein the security level for one of the authentication instances selected by the client includes an uncertainty expressed in terms of fuzzy logic.

15. A system according to claim 7, wherein the one or more combining operators are fuzzy logic operators.

16. A method according to claim 1, wherein each authentication instance is a method of authenticating, and each authentication instance is associated with an authentication mechanism, the authentication mechanism being a class of related authentication instances.

17. A system according to claim 7, wherein each authentication instance is a method of authenticating, and each authentication instance is associated with an authentication mechanism, the authentication mechanism being a class of related authentication instances.

* * * * *